United States Patent [19]

Nagata

[11] Patent Number: 4,725,959
[45] Date of Patent: Feb. 16, 1988

[54] NUMERICALLY CONTROLLED MACHINE TOOL

[75] Inventor: Hiroo Nagata, Kunitachi, Japan

[73] Assignee: Fanuc Ltd, Minamitsuru, Japan

[21] Appl. No.: 2,755

[22] PCT Filed: Mar. 24, 1986

[86] PCT No.: PCT/JP86/00137

§ 371 Date: Nov. 19, 1986

§ 102(e) Date: Nov. 19, 1986

[87] PCT Pub. No.: WO86/05897

PCT Pub. Date: Oct. 9, 1986

[30] Foreign Application Priority Data

Mar. 30, 1985 [JP] Japan .................................. 60-68214

[51] Int. Cl.⁴ ........................ G05B 19/00; G05B 23/00
[52] U.S. Cl. .................................... 364/474; 364/184; 318/565
[58] Field of Search ............... 364/170, 474, 475, 183, 364/184; 377/17; 318/563, 565

[56] References Cited

U.S. PATENT DOCUMENTS

| | | | |
|---|---|---|---|
| 4,549,271 | 10/1985 | Nozawa et al. | 364/167 |
| 4,580,085 | 4/1986 | Eto et al. | 364/184 |
| 4,602,196 | 7/1986 | Matsui | 364/561 |
| 4,638,421 | 1/1987 | Kimizuka et al. | 364/167 |

FOREIGN PATENT DOCUMENTS 0040374 3/1979 Japan .
0111607 7/1982 Japan .

Primary Examiner—Jerry Smith
Assistant Examiner—Allen MacDonald
Attorney, Agent, or Firm—Staas & Halsey

[57] ABSTRACT

The present invention is intended to decrease the number of signal lines between a machine tool (1) and a numerical controller (3) and enable the current position of a movable machine part to be correctly recognized on the size of the numerical controller (3) at all times.

Position sensing means (12) produces a detection signal each time the movable machine part moves a predetermined amount, and serial data generating means (16, 17, 18, 19) generates serial data representing the current position or the like of the movable machine part. Switching means (13) provides either the detection signal or the serial data on the same signal line connecting the machine tool (1) and the numerical controller (3). Follow-up means (21, 22) reproduces the detection signal provided from the position sensing means (12) during the transfer of the serial data. Control means (31, 20) controls the switching means to transfer the detection signal reproduced by the follow-up means (21, 22) to the side of the numerical controller (3) immediately after the serial data has been transferred thereto.

1 Claim, 7 Drawing Figures

4,725,959

NUMERICALLY CONTROLLED MACHINE TOOL

TECHNICAL FIELD

The present invention relates to improvement in or relating to a numerically controlled machine tool, and more particularly to a numerically controlled machine tool which enables the current position of its movable machine part to be correctly recognized on the side of a numerical controller at all times.

BACKGROUND ART

In recent years there has come into use an arrangement in which a counter is provided on the side of a machine tool for counting output detection signals from a position sensor and the current position (the coordinate value) of a movable machine part (a motor, for example) is obtained on the basis of the count value of the counter on the side of a numerical controller. The provision of such a counter on the side of the machine tool precludes the necessity of performing a zero return upon each turning-ON of the power source on the side of the numerical controller, but involves the necessity of providing a signal line for transmitting the count value of the counter to the numerical controller, posing a problem of increasing the number of signal lines between the machine tool and the numerical controller.

As a solution to this problem there has been proposed an arrangement in which a switching circuit actuable for selecting the detection signal of the position sensor and the count value of the counter is provided in the machine tool and the output of the switching circuit is transmitted to the numerical controller. With the provision of such a switching circuit, it is possible to transfer the detection signal of the position sensor and the count value of the counter through one signal line. However, when the machine tool is activated by some cause during the transfer of the count value of the counter to the numerical controller, there will be an error between the actual current position of the movable machine part and the current position of the movable machine part recognized on the side of the numerical controller.

DISCLOSURE OF THE INVENTION

The present invention offers a solution to the above-mentioned problems, and has for its object to reduce the number of signal lines between the numerical controller and the machine tool and to enable the current position of the movable machine part to be correctly recognized on the side of the numerical controller at all times.

To obviate the above-described defects of the prior art, according to the present invention, in a numerically controlled machine tool which has, on the side of the machine tool, position sensing means for producing a detection signal upon each movement of the movable machine part by a predetermined amount and serial data generating means for generating serial data and in which the detection signal from the position sensor and the serial data are transmitted via a signal provided line to the numerical controller, there are provided, on the side of the machine tool, follow-up means for reproducing the detection signal from the position sensor during the transfer of the serial data, switching means for selectively sending the output signal of the follow-up means, the detection signal from the position sensor, and the serial data from the serial data generating means to the numerical controller via the same signal line, and control means for controlling the switching means to send the output signal of the follow-up means to the numerical controller immediately after the transfer of the serial data.

The number of signal lines between the machine tool and the numerical controller can be decreased because there is provided on the side of the machine tool the switching means for selectively transmitting the output signal of the follow-up means, the detection signal from the position sensor and the serial data from the serial data generating means to the numerical controller via the same signal line. Furthermore, since the follow-up means is provided for reproducing the detection signal output from the position sensor during the transfer of the serial data, even if the movable machine part should move during the transfer of the serial data, it would be possible to provide a correct correspondence between the actual current position of the movable machine part and the current position of the movable machine part that is recognized on the side of the numerical controller.

BEST MODE FOR CARRYING OUT THE INVENTION

Figure 1:
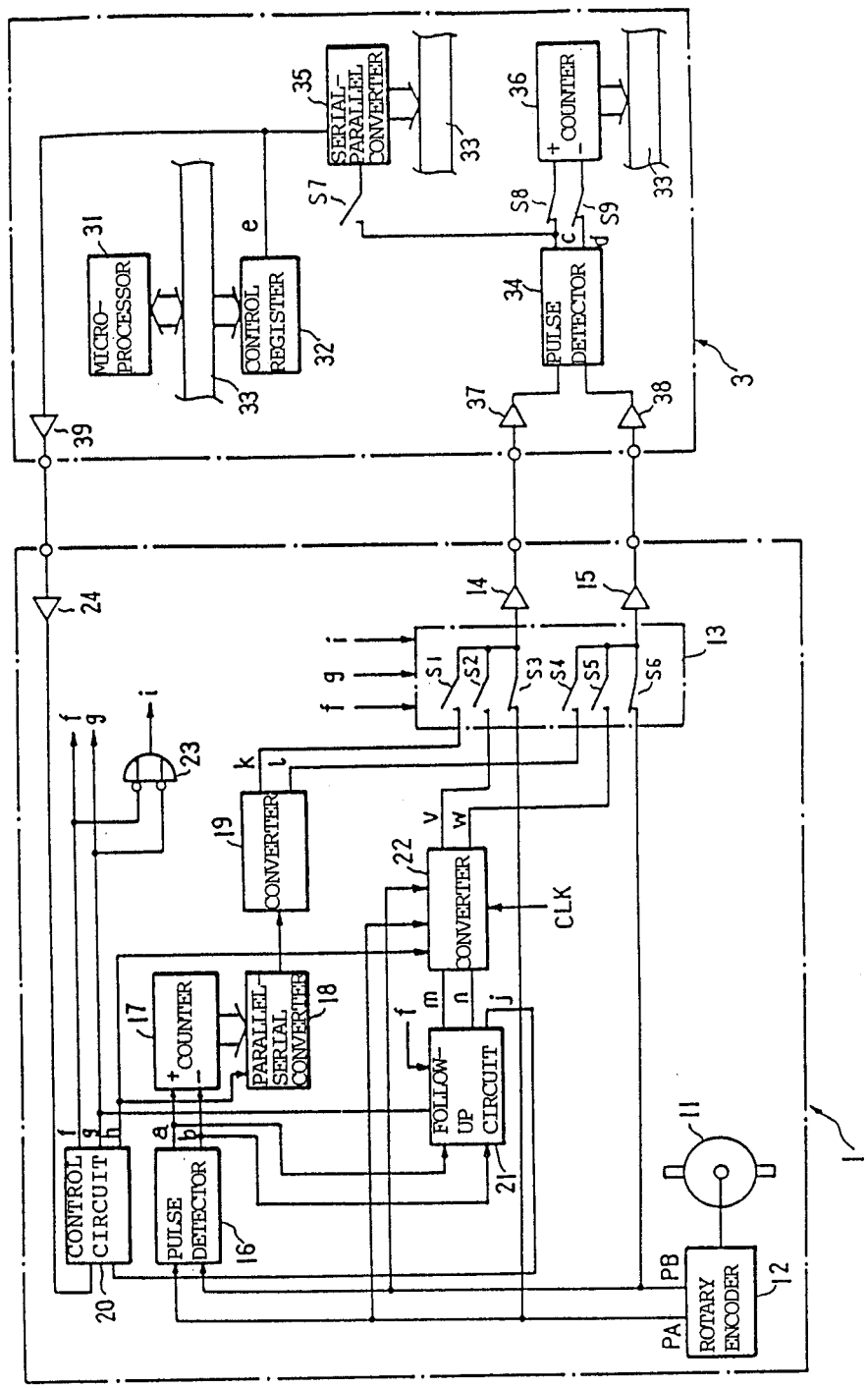
FIG. 1 is a block diagram of an embodiment of the present invention.

FIG. 1 illustrates in block form an embodiment of the present invention. Reference numeral 1 indicates a machine tool, 3 a numerical controller, 11 a motor, 12 a rotary encoder, 13 a switching circuit comprising switches S1 through S6, 14, 15, and 39 drivers, 16 a pulse detector, 17 a counter, 18 a parallel-serial converter, 19 and 22 converters, 20 a control circuit, 21 a follow-up circuit, 23 a NAND gate, 24, 37, and 38 receivers, 31 a microprocessor, 32 a control register, 33 a data bus, 34 a pulse detector, 35 a serial-parallel converter, 36 a counter, and S7 through S9 switches.

Figure 2:
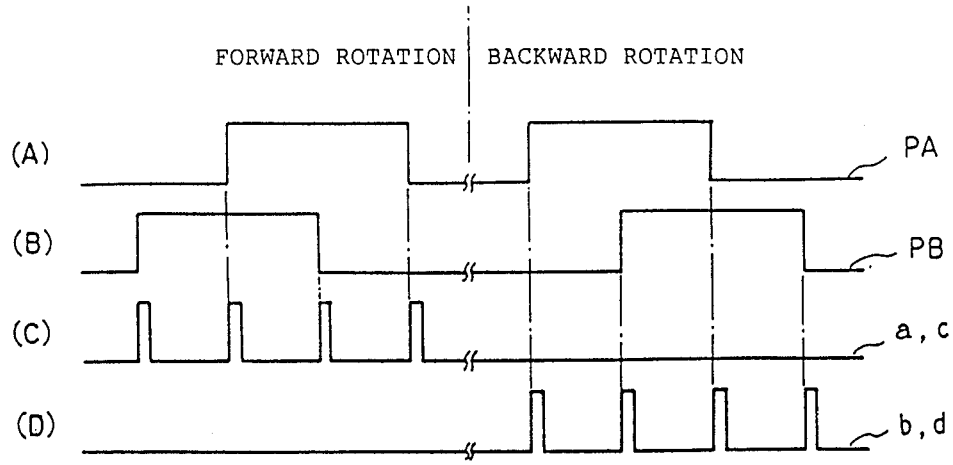
FIG. 2 is a diagram for explaining the operations of a rotary encoder 12 and pulse detectors 16 and 34.

In FIG. 1, the rotary encoder 12 yields a two-phase signal in which an A phase signal PA lags a B phase signal PB by a phase angle of 90° when the motor 11 for driving the movable machine part is rotating in the forward direction, and a two-phase signal in which the A phase signal leads the B phase signal PB by a phase angle of 90° when the motor 11 is rotating in the backward direction, as shown in FIGS. 2(A) and (B). The pulse detectors 16 and 34, which are supplied with the A phase signal PA and the B phase signal PB from the rotary encoder 12, produce +pulses a and c in the cases where the B phase signal PB rises up when the A phase signal PA is at the "0" level, where the A phase signal PA falls when the B phase signal PB is at the "1" level, where the B phase signal PB falls when the A phase signal PA is at the "1" level, and where the A phase signal PA falls when the B phase signal PB is at the "0" level, as shown in FIGS. 2(C). Further, these pulse detectors generate − pulses b and d in the cases where the A phase signal PA rises up when the B phase signal PB is at the "0" level, where the B phase signal PB rises up when the A phase signal PA is at the "1" level, where the A phase signal PA falls when the B phase signal PB is at the "1" level, and where the B phase signal PB falls when the A phase signal PA is at the "0" level, as depicted in FIG. 2(D). The counters 17 and 36, which are supplied with the + pulses a and c and − pulses b and d from the pulse detectors 16 and 34, are incremented or decremented by one, depending upon whether they are supplied at their + terminals with the + pulses a and c or at their − terminals with the − pulses b and d. In consequence, the count value of the counter 17 represents the current position of the movable machine part.

Figure 3:
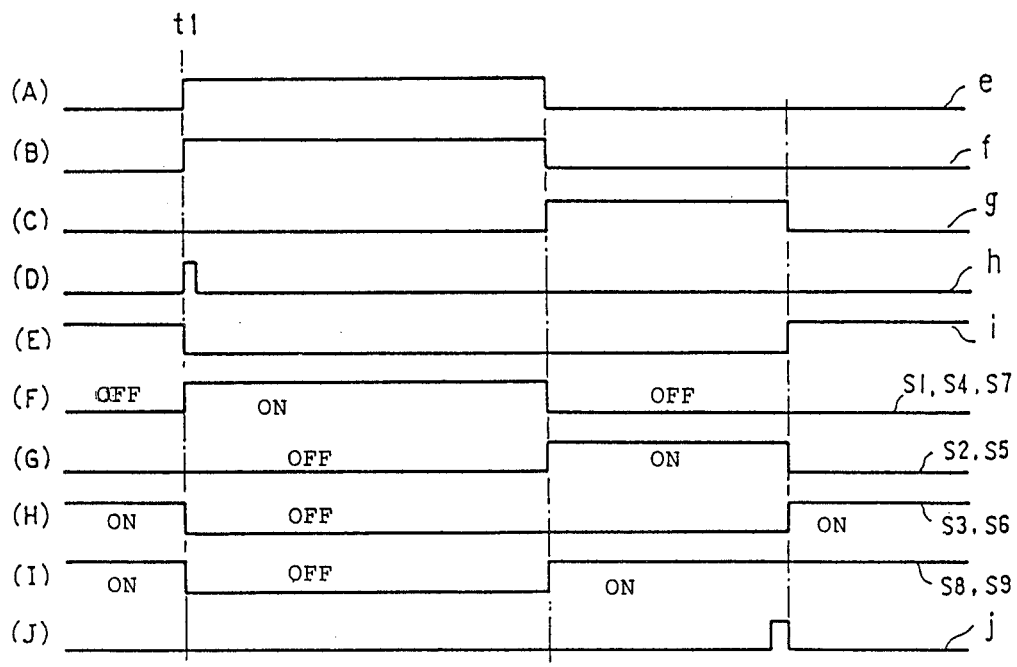
FIG. 3 is a diagram for explaining the operation of the embodiment shown in FIG. 1.

The microprocessor 31 in the numerical controller 3 applies a control signal to the control register 32 to raise its output signal e to the "1" level when requesting the machine tool 1 to send the count value of the counter 17, but it normally holds the output signal e of the control register 32 at the "0" level. The control circuit 20, which is supplied with the output signal e of the control register 32, depicted in FIG. 3(A), holds its output signal f at the "1" level while the signal e is at the "1" level, as shown in FIG. 3(B), retains its output signal g at the "1" level for a period of time from the fall of the signal e to the fall of a zero detection signal j which is produced by the follow-up circuit 21, as shown in FIG. 3(C), and maintains its output signal h at the "1" level for a predetermined period of time in response to the rise-up of the signal e, as depicted in FIG. 3 (D). The switches S1 and S4 are in the ON state while the output signal f of the control circuit 20 remains at the "1" level, as shown in FIG. 3(F). The switches S2 and S5 are in the ON state while the signal g remains at the "1" level, as shown in FIG. 3(G). The switches S3 and S6 are in the ON state while the output signal i of the NAND gate 23 remains at the "1" level, as shown in FIG. 3(I). The switch S7 is in the ON state while the signal e remains at the "1" level, as depicted in FIG. 3(F). The switches S8 and S9 are in the ON state while the signal e remains at the "0" level, as depicted in FIG. 3(I).

Next, a description will be given of the operations of this embodiment while the output signal e of the control register 32 is kept at the "0" level and after the output signal e of the control register 32 goes to the "1" level.

(1) Where the signal e is kept at the "0" level:

When the output signal of the control register 32 is at the "0" level, the switches S3, S6, S8 and S9 are in the ON state and the switches S1, S2, S4, S5 and S7 are in the OFF state, as depicted in FIGS. (F) to (I), and consequently the A phase signal PA and the B phase signal PB from the rotary encoder 12 are applied to the pulse detector 34 in the numerical controller 3 via the switches S3 and S6 as well as to the pulse detector 16 and the converter 22 in the machine tool 1. As mentioned previously, the pulse detectors 16 and 34 respectively apply the + pulses a and c and the − pulses b and d to the counters 17 and 36, each of which is incremented by one upon each application of the pulse and decremented by one upon each application of the + pulse. Accordingly, the count values of the counters 17 and 36 both represent the current position of the movable machine part, so that the microprocessor 31 can recognize the current position of the movable machine part by reading the count value of the counter 36.

(2) After the signal e goes to the "1" level:

When it is necessary to detect the current position of the movable machine part, for example, at the time of turning ON the power source, the microprocessor 31 in the numerical controller 3 provides a control signal to the control register 31, making its output signal e a "1". Assuming, for instance, that the output signal e of the control register 32 goes to the "1" level at a time t1, as shown in FIG. 3(A), the control circuit 20 makes its output signal f a "1" at the rise of the above output signal, as depicted in FIG. 3(B), and at the same time makes its output signal h a "1" and keeps it high for a predetermined period of time, as shown in FIG. 3(D). Accordingly, only the switches S1, S4 and S7 are turned ON when the signal e rises up.

Figure 4:
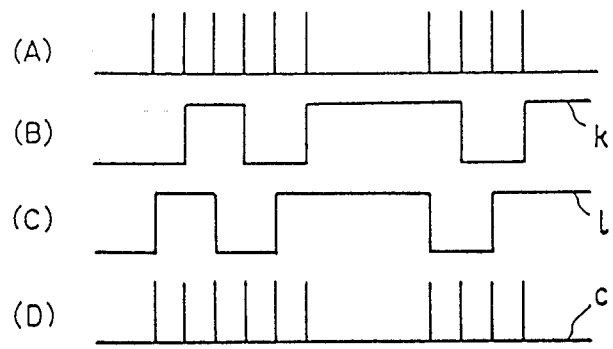
FIG. 4 is a diagram for explaining the operations of a parallel-serial converter 18 and a converter 19.

The serial-parallel converter 18 reads the count value of the counter 17 (which is assumed to have an 8-bit configuration) in response to the rise-up of the output signal h of the control circuit 20, and then it outputs pulses corresponding in number (a decimal number) to four high order bits of the count value and, after certain elapsed time, outputs pulses corresponding in number (a decimal number) to four low order bits of the count value. Now, let it be assumed, for example, that the count value of the counter 17 is $(100)_{10}=(64)_{16}=(01100100)_2$. In this instance, the serial-parallel converter 18 outputs pulses corresponding in number (six) to the four high order bits $(0110)_2$ of the count value and, after a certain elapsed time, outputs pulses corresponding in number (four) to the four low order bits $(0100)_2$, as depicted in FIG. 4(A). The converter 19, when supplied with the pulses from the serial-parallel converter 18, converts them to two-phase pulses. Supposing that the converter is supplied with the pulses shown in FIG. 4(A), it will yield pulse signals k and l depicted in FIGS. 4(B) and (C).

The output signals k and l of the converter 19 are provided via the switches S1 and S4 to the pulse detector 34 in the numerical controller 3, wherein they are converted into pulse signals, thereafter being applied to the serial-parallel converter 35 via the switch S7. Assuming that the signals k and l shown in FIGS. 4(B) and (C) are provided to the pulse detector 34, such + pulses c as shown in FIG. 4(D) are applied from the pulse detector 34 to the serial-parallel converter 35 via the switch S7, and the serial-parallel converter 35 will restore them to the original data $(01100100)_2$. That is, provided that the serial-parallel converter 35 is supplied with six + pulses c in succession and, after a certain elapsed time, four + pulses c in succession, as depicted in FIG. 4(D), it will convert the six pulses into a 4-bit decimal number $(0110)_2$ and sets it in four high order bits of an 8-bit register (not shown) provided in the converter 35 and then converts the four bits into a 4-bit decimal number $(0100)_2$ and sets it in four low order bits of the register. As a result of this, the count value of the counter 17 obtained when the signal e goes to the "1" level, that is, the current position of the movable machine part, is set in the register provided in the serial-parallel converter 35. Accordingly, the microprocessor 31 is able to recognize the current position of the movable machine part by reading the data set in the register of the serial-parallel converter 35. When the count value of the counter 17 is set in the register of the serial-parallel converter 35 as described above, the microprocessor 31 applies a control signal to the control register 32, making its output signal e a "0" or low, as depicted in FIG. 3(A).

Since the count value of the counter 17 is transferred to the numerical controller 3 in this way, there is no need of a zero return when the power source of the numerical controller 3 is turned ON. However, if the motor 11 should rotate by some cause during the transfer of the count value of the counter 17 to the numerical controller 3, an error would occur between the current position of the movable machine part recognized on the side of the numerical controller 3 and the actual current position of the movable machine part. To solve such a problem, this embodiment employs the follow-up circuit 21 and the converter 22 so that no error would occur between the actual current position of the movable machine part and the current position of the movable machine part recognized on the side of the numersical controller 3 even in the event that the motor should rotate during the transfer of the count value of the counter 17.

Figure 6:
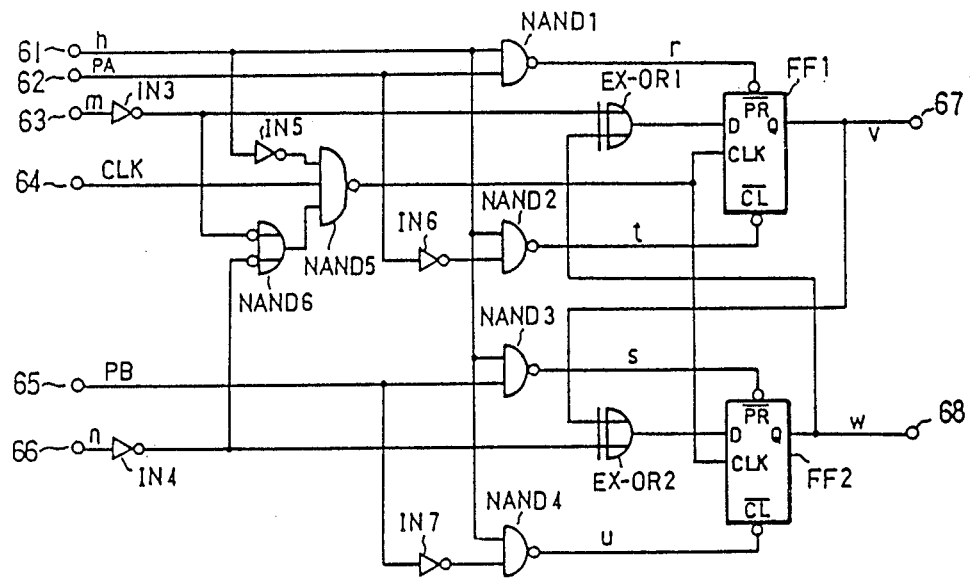
FIG. 6 is a block diagram illustrating, by way of example, the arrangement of a converter 22.
Figure 5:
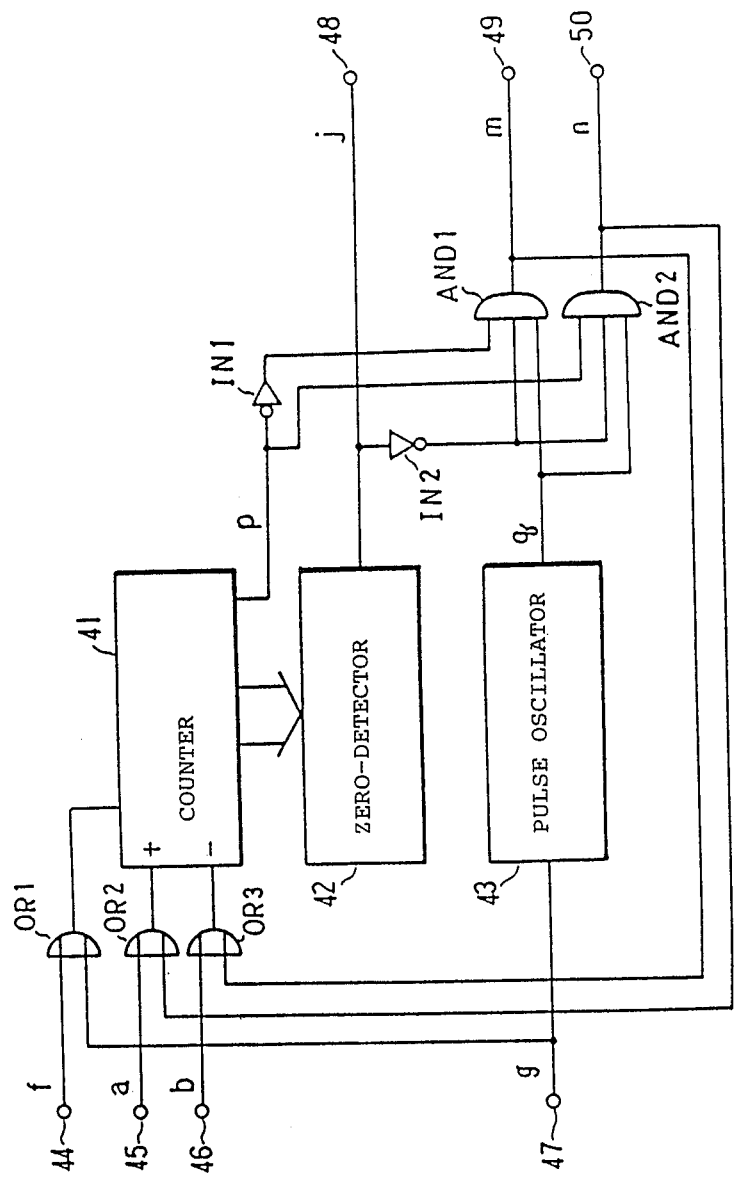
FIG. 5 is a block diagram illustrating, by way of example, the arrangement of a follow-up circuit 21.
Figure 7:
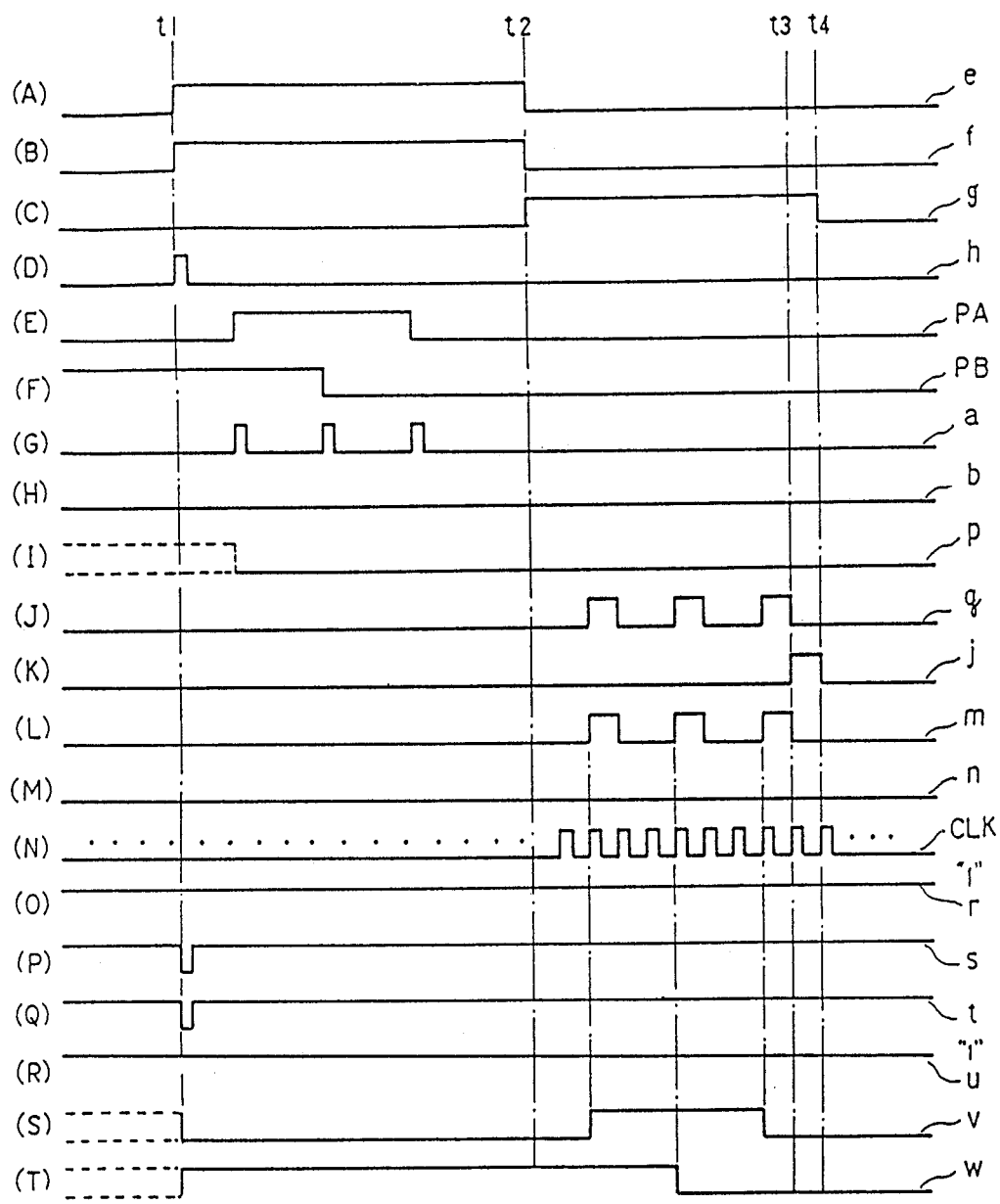
FIG. 7 is a diagram for explaining the operations of the circuits depicted in FIGS. 5 and 6.

FIG. 5 is a block diagram illustrating an example of the arrangement of the follow-up circuit 21. Reference numeral 41 indicates a counter which is operative only when the output signal from an OR gate OR1 is at the "1" level and which is incremented by one upon each application of a pulse to its + terminal and decremented by one upon each application of a pulse to its − terminal. Reference numeral 42 identifies a zero detector which keeps its output signal j at the "1" level for a predetermined time when detecting that the count value of the counter 41 has gone to a "0" from the other count values. Reference numeral 43 designates a pulse oscillator which produces a pulse signal of a predetermined frequency while the output signal g of the control circuit 20 is at the "1" level. Reference numerals 44 to 47 denote input terminals for the signals f, a, b and g, 48 to 50 output terminals for signals j, m and n, OR1 to OR3 OR gates, IN1 and IN2 inverters, and AND1 and AND2 AND gates. FIG. 6 shows an example of the arrangement of the converter 22, in which reference numerals 61 to 66 indicate input terminals, 67 and 68 output terminals, IN3 to IN7 inverters, EX-OR1 and EX-OR2 exclusive OR gates, NAND1 to NAND6 NAND gates, and FF1 and FF2 D flip-flops. FIG. 7 is a diagram for explaining the operations of the circuits depicted in FIGS. 5 and 6. A description will be given, with reference to FIG. 7, of the operations of the circuits shown in FIGS. 5 and 6.

Now, assuming that the output signal e of the control register 32 is made a "1" at a time t1 as shown in FIG. 7(A), the count value of the counter 17 is transferred to the numerical controller 3 in the same manner as described previously. Upon completion of the data transfer at a time t2, the microprocessor 31 applies a control signal to the control register 32, making its output signal e a "0" as shown in FIG. 7(A). The output signals f, g and h of the control circuit 20 undergo such variations as shown in FIGS. 7(B), (C) and (D) in response to such a variation of the output signal e of the control register 32 as shown in FIG. 7(A).

Provided that in the time interval between the times t1 and t2 during which the data is transferred, the motor 11 rotates by some cause and the rotary encoder 12 outputs the A phase signal PA and the B phase signal PB depicted in FIGS. 7(E) and (F), + and − pulses a and b shown in Figs. (G) and (H) are applied to the + and − terminals of the counter 41 in the follow-up circuit 21, respectively. In this instance, since the output signal of the OR gate OR1 is at the "1" level (the output signal f of the control circuit 20 is at the "1" level), the counter 41 is incremented by one upon each application thereto of the pulse a. The counter 41 makes its output signal p a "0" or "1" depending upon whether its count value is larger or smaller than "0". Accordingly, when it is supplied with such + and − pulses a and b as depicted in FIGS. 7(G) and (H), its output signal p becomes such as shown in FIG. 7(I).

At the time t2 the signal e goes to the "0" level and the output signal g of the control circuit 20 goes to the "1" level, in consequence of which the pulse oscillator 43 yields such a pulse signal g of a predetermined frequency as depicted in FIG. 7(J). In this case, since the output signal p of the counter 41 is at the "0" level, as shown in FIG. 7(I), and the AND gates AND1 and AND2 are in the ON state and in the OFF state, respectively, their output signals m and n are such as shown in FIGS. 7(L) and (M), which are provided to the counter 41 and the converter 22. Since the counter 41 is being supplied at the + terminal with the output signal m of the AND gate AND2 via the OR gate OR2 and at the − terminal with the output signal n of the AND gate AND1, the count value of the counter 41 becomes closer to "0" each time the signals m and n go to the "1" level. When the count value CNT of the counter 41 goes to the "0" at a time t3, the zero detector 42 holds its output signal j at the "1" level for a predetermined period of time, as depicted in FIG. 7(K), turning OFF the AND gates AND1 and AND2. The control circuit 20 makes its output g a "0" at the fall of the signal j (at a time t4), as shown in FIG. 7(C), by which the counter 41 and the pulse oscillator 43 stops their operation. That is, in the event that the motor 11 rotates to drive the movable machine part in the period from the time t1 to t3, the follow-up circuit 21 supplies the converter 22 with pulses corresponding in number to the amount of its movement. The oscillation frequency of the pulse oscillator 43 is set higher than the frequencies of the + and − pulses a and b which are provided from the pulse detector 16 when the motor 11 is rotated at the maximum speed.

Next, a description will be given of the operation of the converter 22 which is supplied with the output signals m and n of the follow up circuit 21. The D flip-flops FF1 and FF2 in the converter 22 make their Q terminal outputs v and w "1s" when signals r and s applied to their PR terminals are at the "0" level and signals t and u to their CL terminals are at the "1" level, make their Q terminal outputs v and w "0s" when the signals r and s applied to their PR terminals are at the "1" level and the signals t and u to their CL terminals are "0s", and use their D terminal inputs as the Q terminal outputs v and w at the rise-up of a clock signal CLK shown in FIG. 7(0) when the signals to their PR and CL terminals are both at the "1" level. The clock signal CLK is applied via the NAND gate NAND5 to the clock terminals CLK of the D flip-flops FF1 and FF2 only when the output signal h of the control circuit 20 is at the "0" level and at least one of the output signals m and n of the follow-up circuit 21 is at the level "1".

Now, assuming that the output signals f, g and h of the control circuit 20 vary, as shown in FIGS. 7(B) to (D), that the A phase and B phase signals PA and PB which are applied to input terminals 62 and 65 from the rotary encoder 12 vary, as shown in FIGS. 7(E) and (F), and that the signals m and n which are applied to input terminals 63 and 66 from the follow-up circuit 21 vary, as shown in FIGS. 7(L) and (M), the signals r through u become such as depicted in FIGS. 7(0) to (R)

when the signal h rises (at the time t1). In cosequence, the Q terminal outputs v and w of the D flip-flops FF1 and FF2 will go to the "0" and the "1" level at the time t1, as shown in FIGS. 7(S) and (T), respectively. That is, the D flip-flops FF1 and FF2 will hold the states of the A phase and B phase signals PA and PB at the start of the data transfer. When the signals m and n, depicted in FIGS. 7(L) and (M), are applied from the follow-up circuit 21 after completion of the data transfer at the time t2, the Q terminal outputs v and w undergo such variations as shown in FIGS. 7(S) and (T). In other words, the converter 22 reproduces the variations of the A phase and B phase signals PA and PB in the period from the time t1 to t4, on the basis of the output signals m and n of the follow-up circuit 21 and provides them to the switching circuit 13.

In this instance, while the output signal g of the control circuit 20 is at the "1" level (from the time t2 to t4), only the switches S2 and S5 of those S1 to S6 in the switching circuit 13 are held in the ON state, as mentioned previously, and so the output signals v and w of the converter 22 are provided via the switches S2 and S5 to the pulses detector 34 in the numerical controller 3 for the period of time from t2 to t4. Then, the pulse detector 34 generates the + and − pulses c and d in the same manner as described previously, and the counter 36 is incremented or decremented by one in response to the + and − pulses c and d which are applied thereto via the switches S8 and S9. When the output signal g of the control circuit 20 goes to the "0" level at the time t4, as shown in FIG. 7(C), only the switches S3 and S6 of those S1 to S6 are turned ON and the A phase and B phase signals PA and PB from the rotary encoder 12 are supplied via the switching circuit 13 to the pulse detector 34, after which the counter 36 is incremented or decremented by one in response to the A phase and B phase signals. Therefore, according to this embodiment, even if the motor 11 should rotate by some cause while the count value of the counter 17 representing the current position of the movable machine part is transferred to the numerical controller 3 (from the time t1 to t2) and while the output signals v and w of the converter 22 are applied to the numerical controller 3, that is, while the A phase and B phase signals PA and PB from the rotary encoder 12 are not applied to the numerical controller 3, the current position of the movable machine part recognized on the side of the numerical controller 3 could always be made to correctly correspond to the actual position of the movable machine part.

As described above, according to the present invention, in a numerically controlled machine tool which has, on the side of the machine tool, postion sensing means (the rotary encoder 12 in the embodiment) for generating a detection signal each time a movable machine part such as the motor 11 by a predetermined amount and serial data generating means (comprising the pulse detector 16, the counter 17, the parallel-serial converter 18 and the converter 19 in the embodiment) and in which the detection signal from the position sensing means and the serial data are transferred via a signal line to the side of the numerical controller, there are provided, on the side of the machine tool, follow-up means (comprising the follow-up circuit 21 and the converter 22 in the embodiment) for reproducing the detection signal provided from the position sensing means during the transfer of the serial data, switching means (formed by the switching circuit 13 in the embodiment) for selectively transmitting therethrough the output signal from the follow-up means, the detection signal from the position sensing means, and the serial data from the serial data generating means via the same signal line to the side of the numerical controller, and control means (comprising the microprocessor 31 and the control circuit 20 in the embodiment) for controlling the switching means to send the output signal of the follow-up means to the numerical controller immediately after the transfer of the serial data. Accordingly, the present invention has the advantages that the number of signal lines between the numerical controller and the machine tool can be reduced and that even if the movable machine tool should move during the transfer of the serial data, a correct correspondence could be obtained between the actual current position of the movable machine part and its current position recognized on the side of the numerical controller.

I claim:

1. A numerically controlled machine tool which has, on the side of a machine tool, position sensing means for generating a detection signal each time a movable machine part moves by a predetermined amount and serial data generating means for producing serial data, and in which the detection signal from the position sensing means and the serial data are transferred via a signal line to a numerical controller, characterized in that there are provided on the side of the machine tool:

follow-up means for reproducing the detection signal provided from the position sensing means during the transfer of the serial data;

switching means for selectively transferring the output signal from the follow-up means, the detection signal from the position sensing means, and the serial data from the serial data generating means via the same signal line to the side of the numerical controller; and control means for controlling the switching means to transfer the output signal from the follow-up means to the side of the numerical controller immediately after the transfer of the serial data thereto.

* * * * *